United States Patent
Chen et al.

(10) Patent No.: US 11,526,204 B2
(45) Date of Patent: *Dec. 13, 2022

(54) POWER MANAGEMENT AND TRANSITIONING CORES WITHIN A MULTICORE SYSTEM FROM IDLE MODE TO OPERATIONAL MODE OVER A PERIOD OF TIME

(71) Applicant: Marvell Asia Pte Ltd, Singapore (SG)

(72) Inventors: Chia-Hsin Chen, Santa Clara, CA (US); Avinash Sodani, San Jose, CA (US); Atul Bhattarai, San Jose, CA (US); Srinivas Sripada, Roseville, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,845

(22) Filed: Oct. 22, 2021

(65) Prior Publication Data
US 2022/0043503 A1 Feb. 10, 2022

Related U.S. Application Data

(63) Continuation of application No. 16/947,445, filed on Jul. 31, 2020, now Pat. No. 11,181,967.

(60) Provisional application No. 62/971,650, filed on Feb. 7, 2020.

(51) Int. Cl.
*G06F 1/32* (2019.01)
*G06F 1/08* (2006.01)
*G06F 1/3287* (2019.01)

(52) U.S. Cl.
CPC .............. *G06F 1/3287* (2013.01); *G06F 1/08* (2013.01)

(58) Field of Classification Search
CPC ................................ G06F 1/3287; G06F 1/08
See application file for complete search history.

(56) References Cited

U.S. PATENT DOCUMENTS

| 9,366,724 | B1 | 6/2016 | Carder et al. |
| 16,947,446 | | 7/2020 | Sripada |
| 2010/0332869 | A1 | 12/2010 | Hsin et al. |
| 2011/0314314 | A1 | 12/2011 | Sengupta |
| 2014/0181554 | A1 | 6/2014 | Manne et al. |
| 2016/0378168 | A1 | 12/2016 | Branover et al. |
| 2017/0177046 | A1 | 6/2017 | Garg et al. |

*Primary Examiner* — Stefan Stoynov (57) ABSTRACT

A system includes a plurality of cores. Each core includes a processing unit, an on-chip memory (OCM), and an idle detector unit. Data is received and stored in the OCM. Instructions are received to process data in the OCM. The core enters an idle mode if the idle detector unit detects that the core has been idle for a first number of clocking signals. The core receives a command to process when in idle mode and transitions from the idle mode to an operational mode. A number of no operation (No-Op) commands is inserted for each time segment. A No-Op command prevents the core from processing instructions for a certain number of clocking signals. A number of No-Op commands inserted for a first time segment is greater than a number of No-Op commands inserted for a last time segment. After the last time segment no No-Op command is inserted.

23 Claims, 5 Drawing Sheets

POWER MANAGEMENT AND TRANSITIONING CORES WITHIN A MULTICORE SYSTEM FROM IDLE MODE TO OPERATIONAL MODE OVER A PERIOD OF TIME

CROSS-REFERENCE TO RELATED APPLICATIONS

This application is a continuation application that claims the benefit and priority to the U.S. application Ser. No. 16/947,445 that was filed on Jul. 31, 2020, which claims the benefit and priority to the U.S. Provisional Patent Application No. 62/971,650, filed Feb. 7, 2020, which are incorporated herein in their entirety by reference.

BACKGROUND

Use of multicore systems have become prevalent in recent years especially in light of technologies such as artificial intelligence (AI) and machine learning (ML). It is appreciated that each of the cores within a multicore system include various components such as an on-chip memory, one or more processing units and/or logic circuits, etc. When multiple cores transition from an idle mode to a full operation, a large number of their components, e.g., logic circuits and the on-chip memories turn on simultaneously, causing a sudden power surge in a short amount of time. A sudden power surge may be characterized as Di/Dt which is a sudden increase in current in a short amount of time. It is appreciated that Di/Dt is referenced as power surge throughout this application. Unfortunately, addressing such a sudden surge in power in the short amount of time is difficult. Conventionally, a bulk capacitor on the chip has been used but the type of the bulk capacitor that can be used may be limited by the actual implementation of the chip design. Moreover, a significant drop on the voltage supply may occur if the capacitance is not large enough, impacting performance of the system.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts and the terminology is not intended to be limiting. Unless defined otherwise, all technical and scientific terms used herein have the same meaning as commonly understood in the art to which the embodiments pertain.

A new system and method to transition a core within a multicore system from an idle state to an operational state is disclosed. It is appreciated that idle mode or state of a core may refer to a period that the core is inactive and not processing data whereas operational state or mode refers to period of time that the core is active and processing data. It is appreciated that the terms inactive, idle, and not processing may be used interchangeably throughout the application. In general, any core within the multicore system may enter into an idle mode (independent of other cores within the multicore system) if the core is idle for a certain period of time. A sudden power surge may occur if multiple cores transition from an idle mode to a fully operational mode (i.e. maximum performance) in a short amount of time. As such, transitioning a core from an idle mode into an operational mode is conducted in such a manner that the core becomes fully operational over time and gradually, thereby preventing a sudden power surge. In other words, the performance of the core transitioning from an idle mode to operational mode is throttled, thereby reducing power consumption. In some embodiments, the performance is throttled by inserting a number of no operational (No-Op) commands among actual commands and instructions to be carried out by the core. No-Op commands prevent the core from processing actual commands and instructions for a certain period of time, e.g., one No-Op command may prevent processing by the core for one clock cycle, one No-Op command may prevent processing by the core for three clock cycles, etc. A number of No-Op commands inserted is decreased over time, thereby gradually transitioning the core from an idle mode into a fully operational mode.

Figure 1:
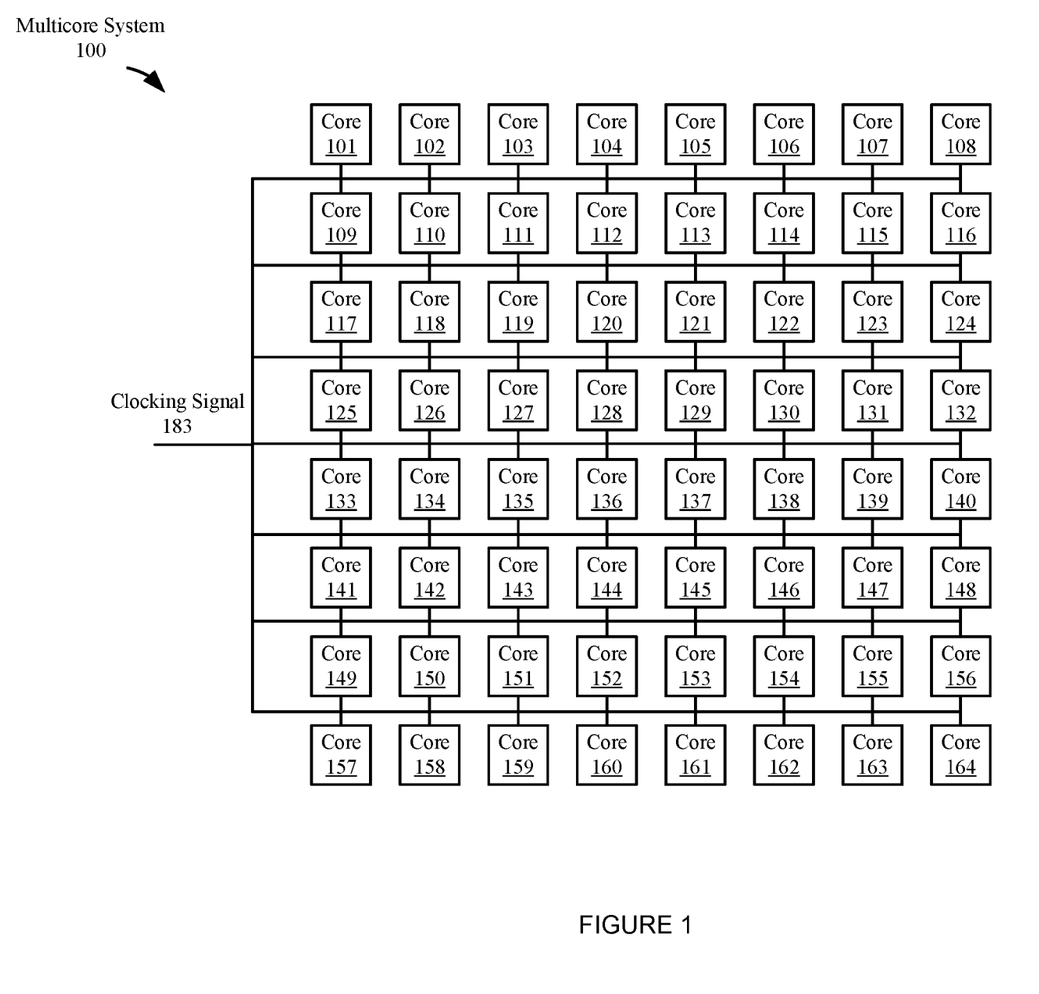
FIG. 1 depicts an example of a diagram of a hardware-based architecture for transitioning idle cores to operational modes in a multicore system according to an aspect of the present embodiments.

FIG. 1 depicts an example of a diagram of a hardware-based architecture for transitioning idle cores to operational modes in a multicore system according to an aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, an architecture includes a multicore system 100 comprising cores 101-164. Each of these components in the architecture is a dedicated hardware block/component programmable by a user at a host (not shown) via software instructions for various operations. When the software instructions are executed, each of the hardware components becomes a special purposed hardware component for practicing certain machine learning functions. In some embodiments, the architecture 100 is on a single chip, e.g., a system-on-chip (SOC).

In the example of FIG. 1, the multicore system 100 includes a plurality of cores 101-164, usually arranged in multiple rows and columns. In this nonlimiting example, the multicore system 100 includes cores 101-108 in its first row, cores 109-116 in its second row, cores 117-124 in its third row, cores 125-132 in its fourth row, cores 133-140 in its fifth row, cores 141-148 in its sixth row, cores 149-156 in its seventh row, and cores 157-164 in its eight row. It is appreciated that the embodiments are described with respect to 64 cores arranged in 8 rows by 8 columns for illustrative purposes only and should not be construed as limiting the scope of the embodiments. For example, any number of cores and any number of rows/columns may be used. It is appreciated that the cores 101-164 may be configured to process data, e.g., in an inference engine for ML or AI.

It is appreciated that as a nonlimiting example, a sudden power surge occurs if cores 101-164 are idle and become operational at the same time or approximately the same time. It is appreciated that in order to prevent a sudden power surge resulting from transitioning idle cores to operational mode at the same time, the idle cores are gradually transitioned from their idle mode to an operational mode. In some nonlimiting examples, the gradual transitioning from an idle mode to an operational mode is achieved by inserting a number of No-Op commands among actual commands for the idle core that are transitioning to operational mode. The number of No-Op commands decrease over time, thereby gradually transitioning the idle core to an operational mode such that its performance is throttled when exiting the idle mode and its performance is gradually increased over time.

It is appreciated that in some embodiments, each core of the multicore system 100 receives a clocking signal 183. A core enters an idle mode if that core is idle for a certain period of time, e.g., when idle and not processing for 8 clock cycles, 9 clock cycles, 10 clock cycles, etc., as a nonlimiting example. It is appreciated that the amount of time to remain idle before entering an idle mode may be user programmable for the multicore system or per core basis. In other words, each core 101-164 may enter an idle mode if it remains idle/inactive for a certain time period, e.g., $t_1$ that can be 8, 9, 10, 11, 12 or any number of clock cycles as an example. As a nonlimiting and illustrative example, core 101 may enter into the idle mode if it remains inactive for $t_1$ period which may or may not coincide with another core such as core 155 entering into idle mode for being inactive for $t_1$ period. It is appreciated that each core may be programmed (in some embodiments user programmable) independent of other cores in the multicore system 100 and have a different time period before entering into an idle mode. For example, core 101 may enter into an idle mode for being inactive for $t_1$ period while core 143 enters into an idle mode for being inactive for $t_2$ period where $t_1$ and $t_2$ are different.

Once in idle mode, the idle core may receive a command to execute. It is appreciated that the terms commands/instructions are used interchangeably throughout the application. As an example and for illustrative purposes only it is presumed that the core 101 is in idle mode. The core 101 may receive one or more commands to execute. As such, a signal may be triggered to wake the core 101 up. In some nonlimiting examples, the core 101 transitions from the idle mode to operational mode (full performance) gradually. In some embodiments, No-Op commands are inserted within the instructions to be executed by core 101 in order to gradually transition the core 101 to full performance operational mode. In some nonlimiting examples, the number of No-Op commands that are initially inserted decreases over time to gradually increase the performance, thereby preventing a sudden power surge. It is appreciated that a No-Op command maintains the core inactive for a certain period, e.g., 1 clock cycle. As such, inserting four No-Op commands for every instruction/command to be processed by the core causes the core to operate at 20% performance. Over time decreasing the number of No-Op commands results in increase in performance, e.g., two No-Op commands inserted for three instructions/commands results in 60% performance, until eventually no No-Op command is inserted to achieve 100% performance.

Figure 2:
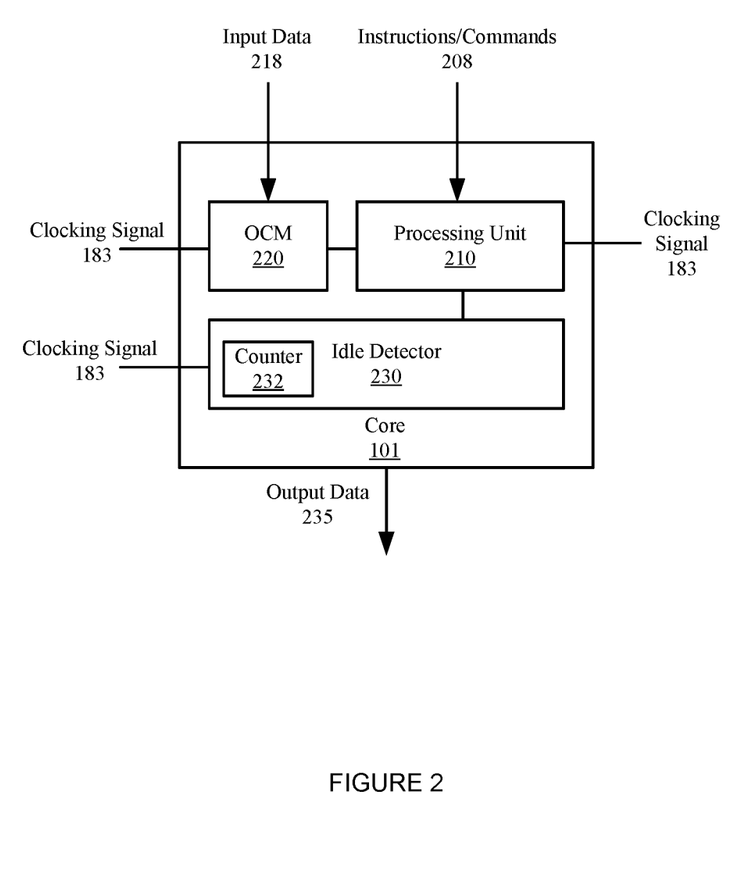
FIG. 2 depicts a nonlimiting example of a core within a multicore system entering an idle mode and transitioning to an operational mode according to an aspect of the present embodiments.

FIG. 2 depicts a nonlimiting example of a core 101 within a multicore system entering an idle mode and transitioning to an operational mode according to an aspect of the present embodiments. The core 101 may include a processing unit 210, an on-chip memory (OCM) 220, and an idle detector 230. In some nonlimiting examples, the OCM 220 receives input data 218 and stores the received data. In some embodiments, the processing unit 210 receives instructions/commands 208 and processes the data stored in the OCM 220 based on the received instructions/commands 208. It is appreciated that the core 101 receives the clocking signal 183. For a nonlimiting example, the processing unit 210, the OCM 220, and the idle detector 230 may each receive the clocking signal 183. It is appreciated that in one nonlimiting example the processed data may be stored in the OCM 220. The core 101 may output the processed data as output data 235. The idle detector 230 may receive the clocking signal 183 and determine whether the core 101 (in some nonlimiting examples the processing unit 210) has been idle/inactive for a certain period of time (which may be user programmable). For illustrative purposes only, it is presumed that the core 101 has been programmed to enter into an idle mode if it (in some nonlimiting example the processing unit 210) is idle/inactive for, e.g., 8 clock cycles. The idle detector 230 receives the clocking signal 183 and determines whether the processing unit 210 is active or inactive. If the core 101 (in this nonlimiting example the processing unit 210) has been inactive for 8 cycles, then the core 101 enters into an idle mode. In some nonlimiting examples, the idle detector 230 uses a counter 232 to determine whether the core 101 should enter an idle mode. For a nonlimiting example, for each clock cycle of the clocking signal 183 that the processing unit 210 is active the counter 232 may be reset. However, for each clock cycle of the clocking signal 183 that the processing unit 210 is inactive/idle then the counter 232 is incremented. If the value stored in the counter 232 reaches 8 cycles, then the idle detector 230 determines that the core 101 should enter into an idle mode.

Once in idle mode, the core 101 may receive a command 208 which wakes the core 101 up. In order to gradually transition the core 101 from idle mode to operational mode (full performance), in some embodiments, a number of No-Op commands are inserted between actual commands to be processed by the processing unit 101. As an illustrative example, for the first 5 clock cycles (also referred to a time segment) 4 No-Op commands are inserted accompanied with one actual command to be processed. In the next 5 clock cycles (i.e. clock cycles 6-10), the number of inserted No-Op commands may be reduced or kept the same as the previous 5 clock cycles. For a nonlimiting example, 3 No-Op commands may be inserted for 2 actual commands to be processed. Similarly, at each subsequent time segment, the number of No-Op commands is either maintained or reduced until finally no further No-Op command is inserted and the core 101 reaches full performance (i.e. 100% performance). For a nonlimiting example, 2 No-Op commands may be inserted for 3 actual commands to be processed for the next time segment (i.e. clock cycles 11-15), 1 No-Op command is inserted for 4 actual commands to be processed for the next time segment (i.e. clock cycles 16-20), and finally no No-Op command is inserted for subsequent time segments (i.e. clock cycles 21 onward). It is appreciated that the core 101 may transition back into an idle mode if it remains inactive/idle for the programmed amount of time, as described above. It is appreciated that the No-Op command may be inserted by the core itself or by a controller external to the core.

It is appreciated that other cores within the multicore system 100 operate similar to that of core 101, as described above. It is further appreciated that the amount of time (i.e. period) for the core to be idle/inactive before entering into an idle mode may be programmable (in some nonlimiting example user programmable) and independent of other cores within the multicore system. It is also appreciated that each core may be programmed to transition from idle mode to operational mode independent of other cores, e.g., one core may be programmed to have a throttling scheme to transition from 0% performance to 20% to 40% to 60% to 80% to 100% whereas another core may be programmed to transition from 0% to 5% to 10% to 15% to 20% to 25% to 30% to 35% to 40% to 45% to 50% to 55% to 60% to 65% to 70% to 75% to 80% to 85% to 90% to 95% to 100%. In other words, the operation, as described above with respect to the amount of time before entering idle mode and the number of No-Op commands to control the throttling amount may be programmable based on the multicore system or based on individual core basis.

Figure 3A:
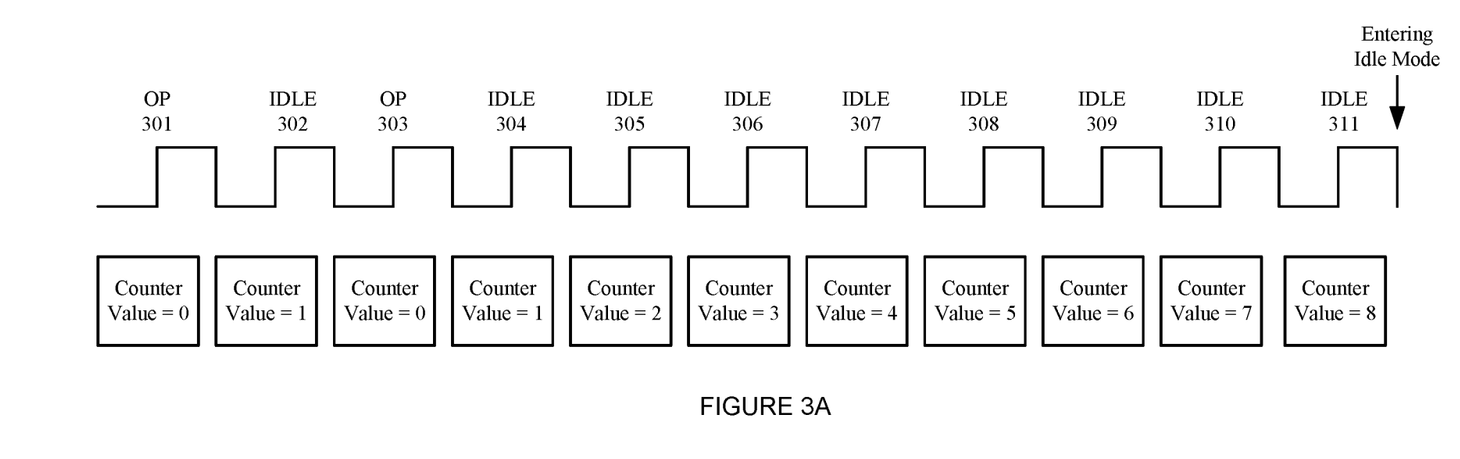
FIGS. 3A-3B depict a clocking signal an operation of a core in a multicore system entering an idle mode and transitioning from the idle mode to an operational mode according to an aspect of the present embodiments.
Figure 3B:
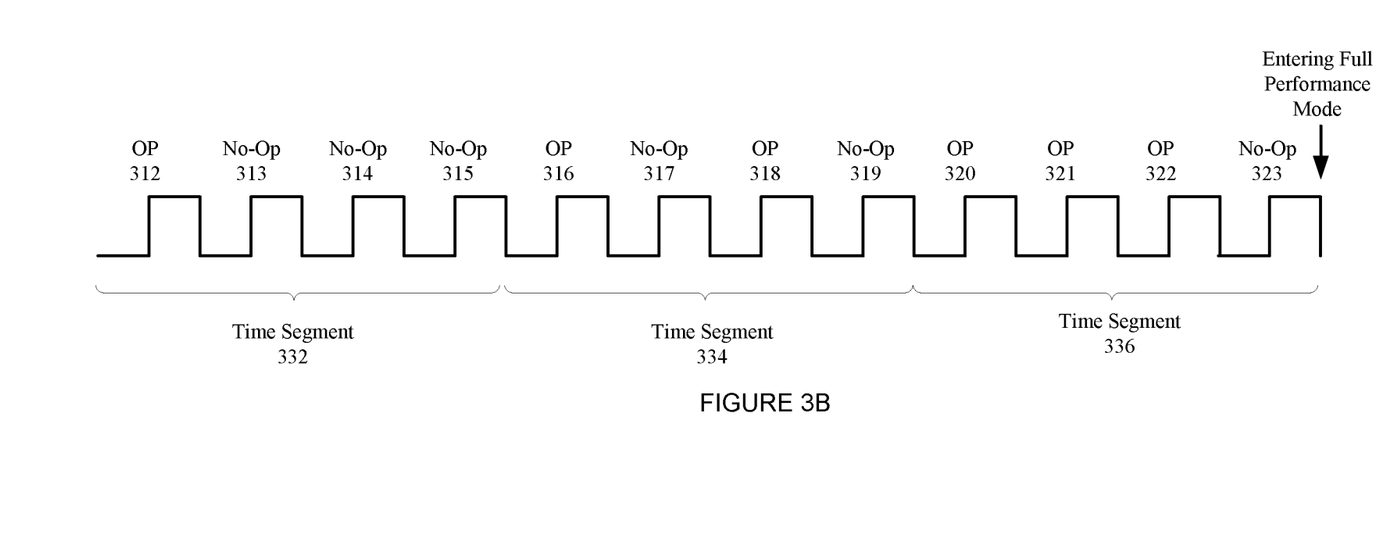

FIGS. 3A-3B depict an example of a clocking signal an operation of a core in a multicore system entering an idle mode and transitioning from the idle mode to an operational mode according to an aspect of the present embodiments. In one nonlimiting example, a command designated as OP 301 at the first clocking signal is received by the core. As such, the counter is not incremented and remains at 0. At the second clock pulse, no command is received (i.e. idle 302), the counter value is incremented and has a value 1. At the third clock pulse of the clocking signal OP 303 is received, therefore resetting the counter. At the fourth to eleventh clock pulse of the clocking signal the core remains idle as designated by idle 305-311. Thus, the counter value is incremented for each clock pulse that the core remains idle/inactive. Accordingly, the counter value reaches 8. In this nonlimiting example, the core enters into an idle mode if it remains inactive/idle for 8 clock cycles. As such, the core enters into an idle mode.

Referring now to FIG. 3B, when the core is in idle mode, OP 312 is received and as such the core is woken up. In order to prevent a sudden power surge, the performance of the core entering into operational mode is throttled. In this nonlimiting example, the core transitions into operational mode in 25% performance increase increments. Accordingly, at time segment 332 that includes 4 clock cycles, three No-Op commands are inserted for one actual command. In other words, No-Op commands 313-315 are inserted for OP 312 command in time segment 332. As such, at time segment 332 a 25% performance is realized. In contrast, at time segment 334 that includes 4 clock cycles, two No-Op commands are inserted for two actual commands. In other words, No-Op commands 317 and 319 are inserted for OP 316 and 318 commands. As such, at time segment 334 a 50% performance is realized. It is appreciated that the No-Op commands may be inserted anywhere in the time segment (e.g., may be positioned at the beginning of the segment, at the end of the segment, interleaved with the actual commands, etc.). At time segment 336 that includes 4 clock cycles, one No-Op command 323 is inserted for three actual commands OP 320-322 commands. As such, at time segment 336, a 75% performance is realized. It is appreciated that at subsequent time segments no No-Op command is inserted resulting in 100% performance. As illustrated in this nonlimiting example, the core transitions from the idle mode to operational mode having 100% performance in 12 clock cycles, thereby preventing a sudden power surge from occurring. It is appreciated that the counter for the core may be reset to 0 once no No-Op commands are inserted and tracks when and if the core should retransition back to idle mode, as described above.

Figure 4:
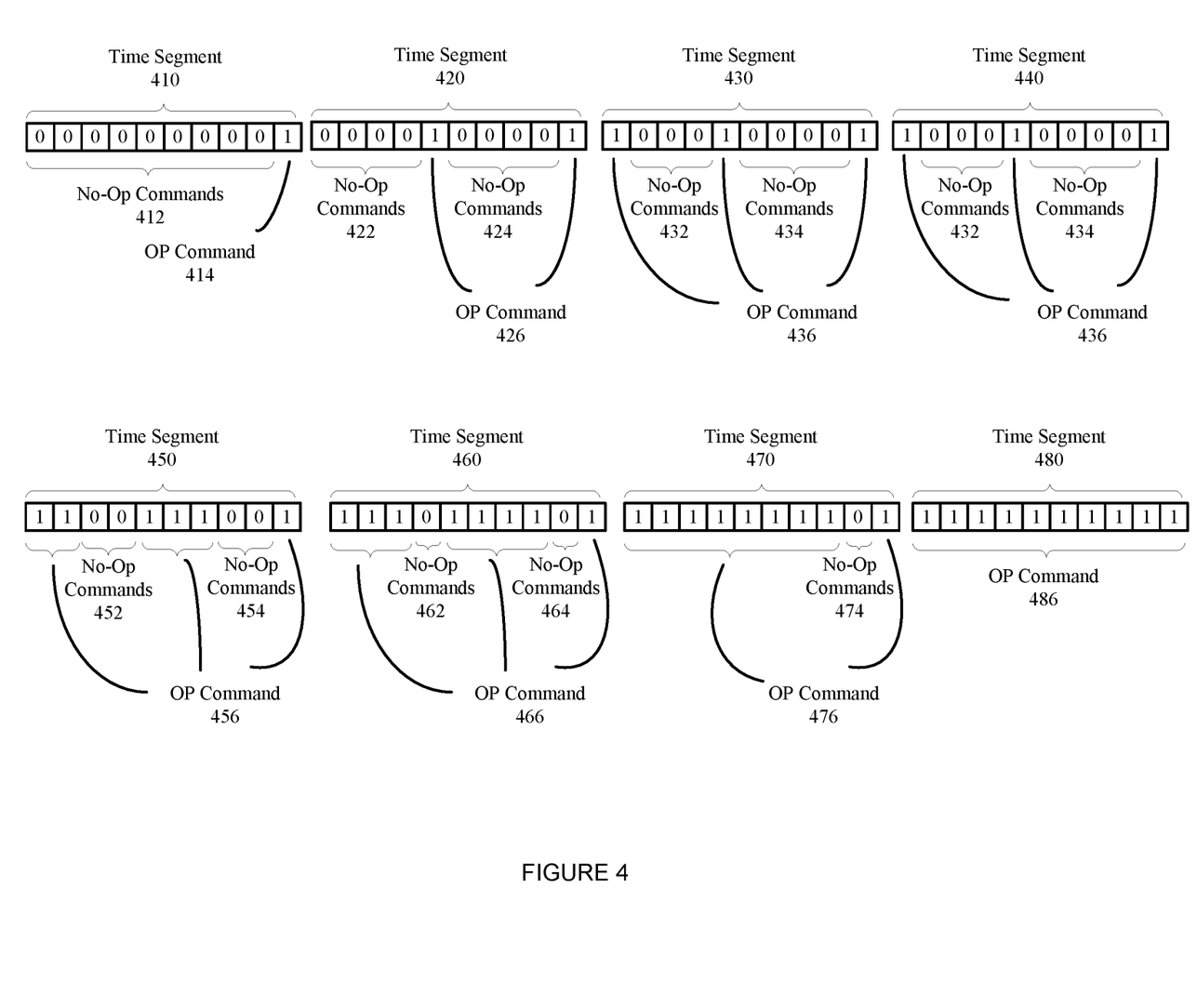
FIG. 4 depicts power throttling during the transition from an idle mode to an operational mode in a multicore system according to an aspect of the present embodiments.

FIG. 4 depicts an example of power throttling during the transition from an idle mode to an operational mode in a multicore system according to an aspect of the present embodiments. In this nonlimiting example, a core in idle mode transitions to operational mode and achieves 100% performance after 70 clock cycles. In this example, at time segment 410 spanning ten clock cycles, nine No-Op commands 412 are inserted for one OP command 414, thereby achieving 10% performance. At time segment 420 immediately subsequent to time segment 410, eight No-Op commands are inserted for two OP commands. For a nonlimiting example, No-Op commands 422 and No-Op commands 424 are inserted for the two OP commands 426, thereby achieving 20% performance. At time segment 430 immediately subsequent to time segment 420, seven No-Op commands are inserted for three OP commands. For a nonlimiting example, No-Op commands 432 and 434 are inserted for the OP commands 436, thereby achieving 30% performance. At time segment 440 immediately subsequent to time segment 430, seven No-Op commands are inserted for three OP commands and in other words the number of No-Op commands is the same as the previous time segment, thereby maintaining the performance at 30%. At time segment 450 immediately subsequent to time segment 440, four No-Op commands are inserted for six OP commands. For example, No-Op commands 452 and 454 are inserted for OP commands 456, thereby achieving 60% performance. At time segment 460 immediately subsequent to time segment 450, two No-Op commands are inserted for eight OP commands. For example, No-Op commands 462 and 464 are inserted for OP commands 466, thereby achieving 80% performance. At time segment 470 immediately subsequent to time segment 460, one No-Op command is inserted for nine OP commands. For a nonlimiting example, No-Op command 474 is inserted for OP commands 476, thereby achieving 90% performance. It is appreciated that in the illustrated nonlimiting example, after time segment 470 no more No-Op command is being inserted thereby achieving 100% performance. For a nonlimiting example, at time segment 480 no No-Op is inserted for the OP commands 486.

Accordingly, as illustrated the core transitions from idle mode to operational mode where its performance is throttled to prevent a sudden power surge. It is further appreciated that the amount of throttling may be implemented such that performance gradually increases. It is appreciated that as illustrated, the number of No-Op commands either reduces or remains the same from its previous time segment until 100% performance is achieved.

Figure 5:
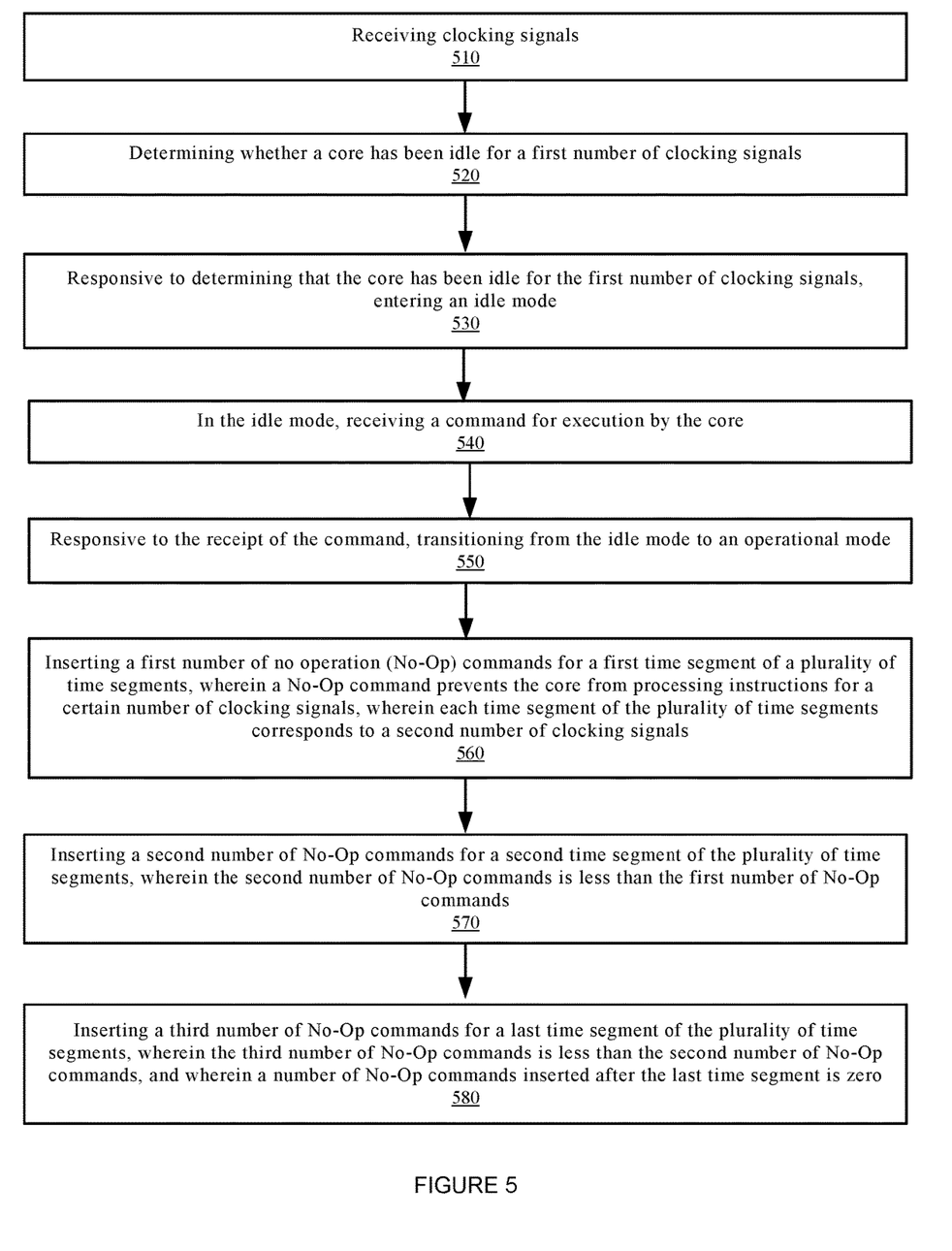
FIG. 5 depicts a flowchart of a nonlimiting example of a core within a multicore system entering into an idle mode and transitioning from the idle mode to an operational mode according to an aspect of the present embodiment.

FIG. 5 depicts a flowchart of a nonlimiting example of a core within a multicore system entering into an idle mode and transitioning from the idle mode to an operational mode according to an aspect of the present embodiment. At step 510, clocking signals are received. At step 520, it is determined whether a core has been idle for a first number of clocking signals. It is appreciated that a counter may be incremented for each clocking signal that the core (in one nonlimiting example the processing unit) is idle/inactive and may be reset when the core is active. In some embodiments, a signal is generated responsive to a value of the counter reaching the first number of clocking signals, e.g., 8 clock cycles as an example. At step 530, responsive to determining that the core has been idle for the first number of clocking signals, the core enters an idle mode. In the idle mode, at step 540, the core receives a command to be executed. At step 550, responsive to the receipt of the command, the core transitions from the idle mode to an operational mode. At step 560, a first number of No-Op commands is inserted for a first time segment of a plurality of time segments. It is appreciated that a No-Op command prevents the core from processing instructions for a certain number of clocking signals (e.g., one clock cycle for each No-Op command). Each time segment of the plurality of time segments corresponds to a second number of clocking signals, e.g., 10 clock cycles as an example illustrated in FIG. 4. At step 570, a second number of No-Op commands is inserted for a second time segment of the plurality of time segments. The second number of No-Op commands is less than the first number of No-Op commands, e.g., number of No-Op commands in time segments 420, 430, 440, 450, 460, 460, and 470 is less than the number of No-Op commands in time segment 410. At step 580, a third number of No-Op commands is inserted for a last time segment, e.g., time segment 470 as an example, of the plurality of time segments 410-470. The third number of No-Op commands is less than the second number of No-Op commands. It is appreciated that a number of No-Op commands inserted after the last time segment, e.g., time segment 470, is zero, e.g., time segment 480.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system comprising:
    a first core including a first processing unit, wherein the first core is configured to:
        receive a first command to execute when in idle mode; and
        responsive to receiving the first command, transition from the idle mode to an operational mode, wherein a number of no operation (No-Op) commands that is greater than or equal to one is inserted for each time segment of a first plurality of time segments, wherein a No-Op command prevents the first core from processing commands for a certain number of clocking signals, and wherein a number of No-Op commands inserted for a first time segment of the first plurality of time segments is greater than a number of No-Op commands inserted for a last time segment of the first plurality of time segments; and
    a second core including a second processing unit, wherein the second core is configured to:
        receive a second command to execute when in idle mode; and
        responsive to receiving the second command, transition from the idle mode to an operational mode, wherein a number of No-Op commands is inserted for each time segment of a second plurality of time segments, wherein a No-Op command prevents the second core from processing commands for another certain number of clocking signals, and wherein a number of No-Op commands inserted for a first time segment of the second plurality of time segments is greater than a number of No-Op commands inserted for a last time segment of the second plurality of time segments.

2. The system of claim 1, wherein the first core and the second core enter the idle mode and transition to the operational mode independent from one another.

3. The system of claim 1, wherein the first core further comprises a first idle detector unit configured to enter into an idle mode if the first core has been idle for a first number of clocking signals, and wherein the second core further comprises a second idle detector unit configured to enter into an idle mode if the second core has been idle for a second number of clocking signals, wherein the first number of clocking signals is different from the second number of clocking signals.

4. The system of claim 3, wherein the first and the second number of clocking signals are user programmable.

5. The system of claim 3, wherein the first idle detector unit comprises a first counter configured to reset responsive to the first core receiving a command to execute and wherein the first idle detector unit is configured to generate a first signal responsive to a value of the counter reaching the first number of clocking signals, wherein the first signal causes the first core to transition to the idle mode, and wherein the second idle detector unit comprises a second counter configured to reset responsive to the second core receiving a command to execute and wherein the second idle detector unit is configured to generate a second signal responsive to a value of the second counter reaching the third number of clocking signals, wherein the second signal causes the second core to transition to the idle mode.

6. The system of claim 1, wherein a number of clocking signals in each time segment of the first plurality of time segments is different from a number of clocking signals in each time segment of the second plurality of time segments.

7. The system of claim 6, wherein the number of clocking signals for the each time segment of the first plurality of time segments and for the each time segment of the second plurality of time segments are user programmable.

8. The system of claim 1, wherein a number of No-Op commands inserted in at least one time segment of the first plurality of time segments is less than or equal to a number of No-Op commands inserted in its immediately preceding time segment, and wherein a number of No-Op commands inserted in at least one time segment of the second plurality of time segments is less than or equal to a number of No-Op commands inserted in its immediately preceding time segment.

9. The system of claim 1, wherein a number of No-Op commands inserted after the last time segment of the second plurality of time segments is zero.

10. A system comprising:
a plurality of cores, wherein each core of the plurality of cores includes a processing unit, and wherein a core of the plurality of cores is configured to:
receive a command to process when in idle mode; and
responsive to receiving the command to process, transition from the idle mode to an operational mode, wherein a number of no operation (No-Op) commands that is greater than or equal to one is inserted for each time segment of a plurality of time segments, wherein a No-Op command prevents the core from processing commands for a certain number of clocking signals, wherein a number of No-Op commands inserted for a first time segment of the plurality of time segments is greater than a number of No-Op commands inserted for a last time segment of the plurality of time segments.

11. The system of claim 10, wherein a number of No-Op commands inserted in at least one time segment of the plurality of time segments is reduced in comparison to its immediately preceding time segment.

12. The system of claim 10, wherein a number of No-Op commands inserted in each time segment of a first subset of time segments of the plurality of time segments is less than a number of No-Op commands inserted in its immediately preceding time segment and wherein a number of No-Op commands inserted in each segment of a second subset of time segments of the plurality of time segment is equal to a number of No-Op commands inserted in its immediately preceding time segment.

13. The system of claim 10, wherein a core of the plurality of cores includes an idle detector unit that comprises a counter configured to reset responsive to the core receiving a command to execute and wherein the idle detector unit is configured to generate a signal responsive to a value of the counter reaching a first number of clocking signals, and wherein the generated signal causes the core to transition into the idle mode.

14. The system of claim 13, wherein the first number of clocking signals is user programmable.

15. The system of claim 10, wherein each time segment of the plurality of time segments corresponds to a second number of clocking signals and wherein the second number of clocking signals is user programmable.

16. The system of claim 10, wherein the core reaches a full performance after the last time segment.

17. The system of claim 10, wherein the core reaches partial performance during the plurality of time segments.

18. The system of claim 10, wherein the core enters the idle mode subsequent to the transition to the operational mode in response to the idle detector unit detecting that the core has been idle for a first number of clocking signals.

19. The system of claim 10, wherein a number of No-Op commands inserted after the last time segment is zero.

20. A method comprising:
in idle mode, receiving a command for execution by a core;
responsive to the receipt of the command, transitioning from the idle mode to an operational mode;
inserting a first number of no operation (No-Op) commands that is greater than or equal to one for a first time segment of a plurality of time segments, wherein a No-Op command prevents the core from processing commands for a certain number of clocking signals;
inserting a second number of No-Op commands for a second time segment of the plurality of time segments, wherein the second number of No-Op commands is less than the first number of No-Op commands; and
inserting a third number of No-Op commands for a last time segment of the plurality of time segments, wherein the third number of No-Op commands is less than the second number of No-Op commands.

21. The method of claim 20, wherein a number of No-Op commands inserted in at least one time segment is less than or equal to a number of No-Op commands inserted in its immediately preceding time segment.

22. The method of claim 20 further comprising:
incrementing a counter for each clocking signal that the core is idle;
generating a signal responsive to a value of the counter reaching a first number of clocking signals, and wherein the generated signal causes the core to transition into the idle mode; and
resetting the counter responsive to the core receiving a command to execute if a value of the counter is less than the first number of clocking signals.

23. The method of claim 20, wherein a number of No-Op commands inserted after the last time segment is zero.

* * * * *